June 29, 1965 G. L. MOUTRAY 3,191,492

TRI-FOLD REAR PROJECTION SCREEN

Filed March 14, 1963

GUILFORD L. MOUTRAY
*INVENTOR.*

BY

Robert K. Rhea
AGENT

3,191,492
TRI-FOLD REAR PROJECTION SCREEN
Guilford L. Moutray, 2433 NW. 36 Terrace, Oklahoma City, Okla.
Filed Mar. 14, 1963, Ser. No. 265,144
1 Claim. (Cl. 88—24)

The present invention relates to picture projectors and more particularly to a portable rear projection screen.

Rear projection or daylight screens are not new but most of those presently available comprise a bulky frame and stand which is difficult to move from one location to another and occupy considerable storage space when not in use. Furthermore, the conventional rear projection screen, because of its size and supporting components, is relatively expensive and is not acceptable for use by persons requiring a lightweight inexpensive screen for home use or by traveling salesmen.

It is, therefore, the principal object of the instant invention to provide a lightweight portable rear projection screen which may be folded to define a compact rectangular unit comparable in size to a briefcase.

Another object is to provide a screen of this class which may be readily and easily assembled for motion picture or transparent slide projection and which may be folded into a compact unit for storage or traveling.

Another object is to provide a rear projection screen of the folding type which is substantially triangular in shape, when viewed from the top or bottom, and when in picture projecting position is sturdily supported by either triangular side.

A further object is to provide a rear projection screen wherein the reflecting member is formed of unbreakable lightweight material.

Yet another object is to provide a rear projection screen wherein all members are hingedly connected to a single housing and fold in overlapping locking relation into the housing.

The present invention accomplishes these and other objects by providing a box-like housing open at one side and having a screen carrying frame and cooperating closure members hingedly connected to the housing.

Other objects will be apparent from the following description when taken in conjunction with the accompanying single sheet of drawings, wherein.

Like characters of reference designate like parts in those figures of the drawings in which they occur.

In the drawings.

Figure 3:
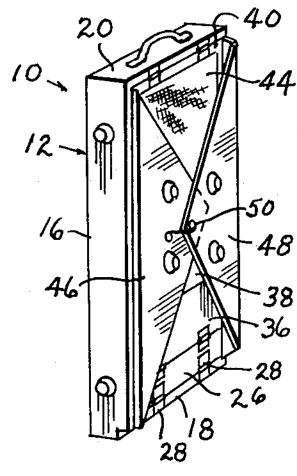

The reference numeral 10 indicates the device, as a whole, which is substantially triangular in shape, as viewed from the top when in picture projecting position (FIG. 1), and is substantially rectangular in shape when folded in storage position (FIG. 3).

The device 10 includes a base or housing portion 12, substantially box-like in configuration, having relatively narrow sides 14 and 16 and ends 18 and 20 rigidly joined at their respective ends and connected to the back or side wall 22 to complete the housing. Transversely the side 16 and ends 18 and 20 are substantially equal while the transverse width of the side 14 is greater than the side 16 a distance substantially equal to the thickness of the sides for the purpose more fully explained hereinbelow.

An image reflecting member 24, preferably a japanned or ferrotype plate, is secured to the inner surface of the housing back 22. Obviously a glass mirror, not shown, may be used in lieu of the ferrotype plate if desired.

A substantially square relatively thin door-like closure member 26 is connected by one of its sides by hinges 28 to the end 18. The size of the door 26 is such that it may be folded inwardly of the housing sides 14 and 16 and overlie the adjacent end portion of the plate 24. An opening or window 30 is centrally formed in the door 26 for the purposes which will presently be apparent.

Upper and lower rectangular flaps 32 and 34 are hingedly connected respectively to the upper and lower wall of the door defining the ends of the window opening 30. Each of the flaps 32 and 34 are of a size which permits swinging movement through the window opening 30. A pair of rectangular side flaps 36 and 38 are similarly connected by one respective edge to the respective side wall of the door forming the sides of the opening 30. The transverse width of the respective flaps are substantially equal and when the side flaps 36 and 38 are folded, inwardly coincident with the plane of the window 30, their free edges meet in abutting relation.

A substantially square screen frame 40 is similarly connected by one of its sides to the end 20 of the housing by hinges 42. The overall size of the screen frame 40 is such that it may be pivoted inwardly of the housing 12 between the sides 14 and 16 and overlie the adjacent end of the door 26 when folded into the housing.

A lens or screen 44 is placed between and secured to the respective sides of the frame 40. The screen 44 may be glass or plastic but is preferably formed of transparent flexible vinyl material tautly stretched across the screen opening. One surface of the screen material is coated with a material presently marketed under the trade name Polacoat which comprises a translucent material containing minute glass particles or beads which reveals the details of an image projected onto the screen.

Figure 1:
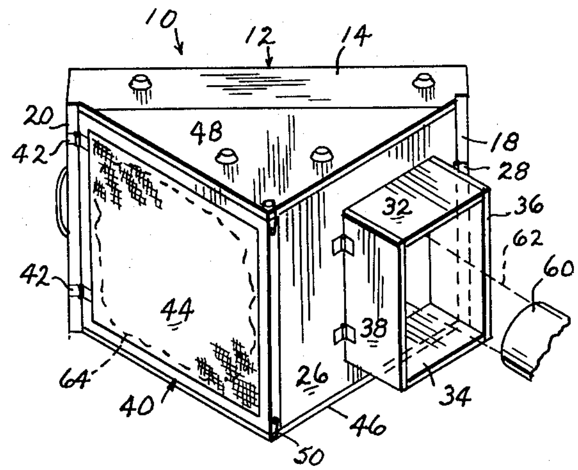
FIGURE 1 is a perspective view of the device in operative position.
Figure 2:
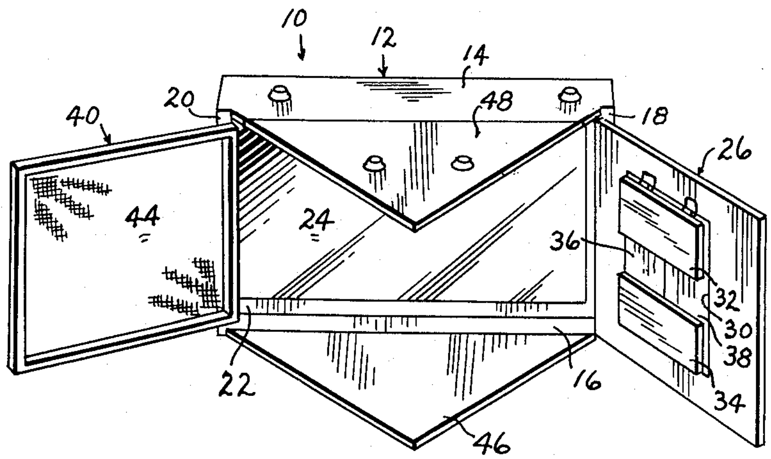
FIGURE 2 is a view similar to FIG. 1 showing components of the screen in opened relation; and, FIGURE 3 is a perspective view of the device when folded for storage.

A pair of right triangular shaped flaps or closure members 46 and 48 are hingedly connected by their respective base side to the respective free edge of the housing sides 14 and 16. The right angle corner of each of the members 46 and 48, forming the apex of the triangular shape, are positioned outwardly of the housing in vertical aligned relation as seen in FIGS. 1 and 2. The closure member 46 folds inwardly toward the housing 12 and overlaps a portion of the screen frame 40. Similarly the member 48 folds inwardly toward the housing overlapping a portion of the member 46. As shown in FIG. 3, a suitable hook or fastener 50 connects the overlapping ends of the members 46 and 48 to hold the unit in folded or stored position.

*Operation*

In operation the device is normally in folded position, as shown in FIG. 3. The housing 12 is positioned on one of its sides 14 or 16 and the closure members 46 and 48 are opened to extend horizontally outward of the housing parallel with the respective sides. The screen frame 40 is pivoted outwardly so that its outer surface coincides with the vertical plane defined by the adjacent free edges of the triangular closure members 46 and 48. The frame is held in this position by suitable fastening means interconnecting the frame and the closure members 46 and 48. The door 26 is similarly pivoted outwardly so that the plane of its outer surface coincides with the vertical plane defined by the other side edges of the closure members 46 and 48 and the free end of the screen frame 40. The flaps 32, 34, 36 and 38, are pivoted outwardly to form a rectangular light shield aperture in cooperation with the window 30 for the admission of the picture image. The lens portion 60 of a projector, not shown, is positioned adjacent the aperture formed by the flaps so that the image, indicated by the dotted lines 62, enters the window 30 and is reflected from the plate 24 to provide an image 64 on the screen 44 as large as the dimensions of the latter will permit. The device is collapsed or folded to the position shown by FIG. 3 by reversing the above unfolded sequence.

Obviously the invention is susceptible to some change or alteration without defeating its practicability, and I therefore do not wish to be confined to the preferred embodiment shown in the drawings and described herein, further than I am limited by the scope of the appended claim.

I claim:

A daylight rear projection portable folding screen for receiving an image from a projector, comprising: a box-like housing having ends and one side of substantially equal transverse width and a second side transversely greater in width a distance equal to its thickness, said housing having a back connecting said ends and said sides; a ferrotype reflecting plate secured within said housing adjacent the inward surface of said housing back; an open screen frame hingedly connected by one of its sides to one end of said housing for swinging movement into and out of the housing between the sides thereof; a flexible screen extending tautly across and secured to the respective four sides of said frame; a door hingedly connected by one of its sides to the other end of said housing for swinging movement into and out of the latter between the sides thereof, said door having a central rectangular window; upper and lower flaps hingedly secured to said door for vertical swinging movement through the window; opposing side flaps secured to the wall of said door defining the sides of said window, said upper and lower and said side flaps projecting outwardly normal to the outer surface of said door to form a light shield in cooperation with said window for passing a picture image beam; and a pair of right triangular shaped closure members each hingedly connected at their respective base side to the respective free edge of said housing sides for movement toward and away from the open side of said housing, said screen frame and said door each being of a size to coincide with the respective plane defined by the free edges of said triangular shaped closure members when the latter are positioned laterally of said housing to define a closed projection booth.

References Cited by the Examiner

UNITED STATES PATENTS

| | | | |
|---|---|---|---|
| 2,147,612 | 2/39 | Rosenbloom | 88—24 |
| 2,685,817 | 8/54 | Freeman | 88—24 |
| 3,094,037 | 6/63 | Kapilow | 352—104 |

JULIA E. COINER, *Primary Examiner.*